United States Patent [19]

Inoue et al.

[11] Patent Number: 4,734,477

[45] Date of Patent: Mar. 29, 1988

[54] METHOD FOR CAST MOLDING PLASTIC SUBSTRATE

[75] Inventors: Takao Inoue; Tadashi Sakairi, both of Osaka; Mitsutoshi Aritomi; Tadao Takeyama, both of Ibaraki; Takahiro Matsuo, Osaka, all of Japan

[73] Assignees: Mitsubishi Petrochemical Co., Ltd., Tokyo; Matsushita Electric Industrial Co., Ltd., Osaka, both of Japan

[21] Appl. No.: 886,167

[22] Filed: Jul. 16, 1986

[30] Foreign Application Priority Data

Jul. 16, 1985 [JP] Japan ................. 60-156494
May 29, 1986 [JP] Japan ................. 61-123968

[51] Int. Cl.$^4$ ............................................. C08F 18/00
[52] U.S. Cl. .................................... 526/320; 526/273; 264/236; 264/1.3
[58] Field of Search ............... 526/320, 273; 264/236, 264/1.3, 106

[56] References Cited

U.S. PATENT DOCUMENTS

| 4,010,088 | 3/1977 | Okubo et al. | 522/170 |
| 4,138,300 | 2/1979 | Kaetsu et al. | 526/320 |
| 4,273,799 | 6/1981 | Kawada et al. | 526/320 |
| 4,439,291 | 3/1984 | Irving et al. | 526/320 |
| 4,482,511 | 11/1984 | Komatsubara | 264/1.3 |

FOREIGN PATENT DOCUMENTS

| 0156372 | 2/1985 | European Pat. Off. | |
| 0171294 | 2/1986 | European Pat. Off. | 264/25 |

*Primary Examiner*—Joseph L. Schofer
*Assistant Examiner*—N. Sarofim
*Attorney, Agent, or Firm*—Oblon, Fisher, Spivak, McClelland & Maier

[57] ABSTRACT

A method for producing a plastic substrate having Tg of 110° C. or more is disclosed, which comprises radical polymerizing a polyfunctional (meth)acrylate compound in a mold by a cast molding method, removing the resulting substrate from the mold when the glass transition temperature of the substrate reaches 10° to 100° C., and then post-curing the substrate. The method of the present invention can provide high quality plastic substrates with high productivity.

9 Claims, 1 Drawing Figure

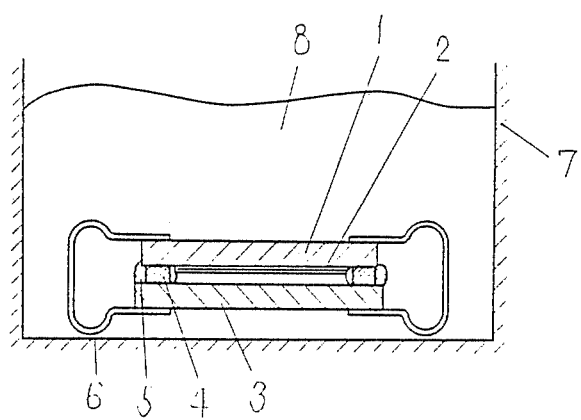

METHOD FOR CAST MOLDING PLASTIC SUBSTRATE

FIELD OF THE INVENTION

The present invention relates to a method for molding a transparent plastic substrate, and more particularly, to a method for molding a transparent plastic substrate which is used as a disc substrate for discs (e.g., optical discs and magneto-optical discs) in an optical writing, reading and erasing system.

BACKGROUND OF THE INVENTION

A transparent plastic substrate has an excellent low birefringence which is the basic performance in optical properties, and a great attention is recently paid thereto.

The transparent plastic substrate is generally produced by a cast molding method comprising pouring a polymerizable liquid material such as polyallyl carbonate, polyolpoly(meth)acrylate or epoxy acrylate into a cavity of a mold and radical polymerizing the same in the mold to obtain a transparent plastic substrate as disclosed in, for example, Japanese Patent Application (OPI) Nos. 130450/83 and 137150/83 (the term "OPI" as used herein means a "published unexamined Japanese patent application").

In addition, a method for conducting photopolymerization in a mold constituted by glass plates at both sides (Japanese Patent Application No. 202557/85), a method of thermal polymerization after casting a liquid resin into a mold under vacuum, a method of thermal polymerization under pressure for a liquid resin casted (Japanese Patent Application (OPI) No. 203414/85), and so on are known.

Conventional cast molding method of the transparent plastic substrate requires about 24 hours from the pouring of a reactive liquid material into the mold used to completion of molding of the transparent plastic substrate. Therefore, the efficiency of use of the mold is extremely low, and the number of stampers to transfer signals, grooves for trucking and so on is increased. This is a serious problem to the productivity of the transparent plastic substrate.

Furthermore, as a method for increasing the efficiency of use of the mold, it is sufficient to shorten the molding time. However, for example, if radical polymerization is completed in the mold by light energy, polyfunctional (meth)acrylate compounds produce a residual strain by the shrinkage during polymerization or curing reaction.

In demolding the transparent plastic substrate from the mold constituted by a glass, a metal, a rubber or the like after the completion of molding, the transparent plastic substrate is broken or causes cracking, or the mold is broken. Those are the practical problems. Accordingly, it has been desired to improve the defects.

SUMMARY OF THE INVENTION

Accordingly, an object of the present invention is to provide a practically useful molding method for the plastic substrate which can increase the efficiency of use of a mold used in the cast molding method of polyfunctional (meth)acrylate compounds, and can minimize cracking or breakage of the plastic substrate during radical polymerization and demolding.

Another object of the present is to provide a method for obtaining a transparent plastic substrate by radical polymerization of a polyfunctional (meth)acrylate compound by a cast molding method, wherein when the glass transition temperature (Tg) of the plastic substrate obtained in the mold by radical polymerization reaches 10° to 100° C., the substrate is removed from the mold, and the substrate is post-cured to obtain a substrate having a Tg of 110° C. or more.

Further objects of the present invention is to provide a method for obtaining a transparent plastic substrate by radical polymerization of a polyfunctional (meth)acrylate by a cast molding method, wherein when a glass transition temperature (Tg) of the plastic substrate obtained in the mold by radical polymerization reaches 10° to 100° C., the substrate is removed from the mold, the substrate is postcured to obtain a substrate having a Tg of 110° C. or more, and the substrate is further post-cured at a temperature of 150° C. or more to obtain a plastic substrate having a small residual content of double bond, a low water absorption and so little influence on the deterioration of a life of recording film.

In accordance with the method of the present invention, the radical polymerization time in the mold is about 0.5 to 1 hour and the pre-cured substrate is post-cured outside the mold. Therefore, the amount of substrates produced per mold can be increased to 20 to 40 times.

Further, since the substrate pre-cured under the condition that the glass transition temperature is low is removed from the mold, the breakage of the substrate does not substantially occur.

Furthermore, in accordance with the present invention, the plastic substrate obtained is heated at least at 150° C. as the post-curing temperature, so that the residual content of double bond in the final plastic substrate is decreased to 30% or less, and the degree of water absorption of the substrate is decreased. As a result, the effect of increasing optical disc substrate characteristics can be increased.

BRIEF DESCRIPTION OF THE DRAWING

The FIGURE is an illustrative drawing showing an experimental method to examine the relationship between the deterioration of a recording film and the degree of water absorption of a synthetic resin substrate.

1 ... Synthetic resin substrate
2 ... Recording material
3 ... Quartz plate
4 ... Teflon spacer
5 ... Paraffin wax
6 ... Clamp
7 ... Thermostat
8 ... Pure water

DETAILED DESCRIPTION OF THE INVENTION

The polyfunctional (meth)acrylate compound is a compound represented by the formula (I):

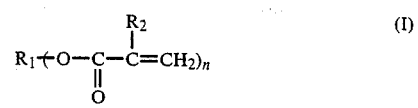

wherein $R_1$ is an alcohol residue having 2 to 50 carbon atoms, $R_2$ is H or $CH_3$, and n is an integer of 2 to 6, and which, when radical polymerized, produces a cured product having a glass transition temperature of 110° C. or more.

Representative examples of the polyfunctional (meth)acrylate compound are methacrylic or acrylic acid esters such as 2,2'-bis[4-(β-methacryloyloxy)cyclohexyl]propane, 2,2'-bis[4-(β-methacyloyloxydiethoxy)cyclohexyl) propane, bis(oxymethyl)tricyclo[5,2,1,0$^{2,6}$]decane dimethacrylate, 1,4-bis(methacyrloyloxymethyl)cyclohexane, trimethylolpropanetri(meth)acrylate, neopentylglycol di(meth)acrylate, 1,6-hexanediol di(meth)acrylate, 1,3-butanediol di(meth)acrylate, diethylene glycol di(meth)acrylate, and 2,2'-bis[4-(methacryloyldiethoxy)phenylpropane. These compounds are used alone or as mixtures thereof. 2,2'-Bis[4-(β-methacryloyloxyethoxy)cyclohexyl]propane, bis(oxymethyl)-tricyclo[5,2,1,0$^{2,6}$]decane dimethacrylate, and 1,4-bis(methacryloyloxymethyl)cyclohexane are particularly preferred from the standpoint of optical properties. The term "(meth)acrylate" as used herein means both acrylate and methacrylate.

In addition to the compounds of the formula (I), radical polymerizable monomers conventionally used as viscosity controlling agents can be used in an amount of 10wt% or less. Examples of such polymerizable monomers are vinyl compounds such as styrene, chlorostyrene, dichlorostyrene, vinyltoluene, divinylbenzene, vinyl acetate and vinyl chloride; (meth)acryl compounds such as methyl methacrylate, phenyl (meth)acrylate, benzyl (meth)acrylate, 2-phenoxyethyl (meth)acrylate, cyclohexyl (meth)acrylate, glycidyl (meth)acrylate, epoxy (meth)acrylate and urethane (meth)acrylate; allyl compounds such as diethylene glycol bisallylcarbonate and diallyl phthalate; and the like.

The radical initiator used in polymerization of the monomer is not particularly limited. For example, peroxides such as benzoyl peroxide, diisopropyl peroxy carbonate lauryoyl peroxide and tertiary butyl peroxy pivalate, azo compounds such as azoisobutylonitrile, photosensitizers such as benzophenone, benzoin ethyl ether, benzyl, acetophenone and anthraquinone, and sulfur compounds such as diphenyl sulfide and thiocarbamates, which are conventional radical initiator can be used.

The above radical polymerization can be carried out under conventional radical polymerization conditions (e.g., heating, light irradiation and electron beam irradiation). The amount of the radical initiator added is 0.01 to 10 parts by weight per 100 parts by weight of the polyfunctional (meth)acrylate compounds. The polymerization temperature is 10° to 200° C. and preferably 30° to 150° C. The polymerization can be carried out in an atmosphere of air or inert gas.

The transparent plastic substrate obtained by radical polymerizing the above polyfunctional (meth)acrylate by the cast molding method has the glass transition temperature (Tg) at the time of removing the substrate from the mold of 10° to 100° C. If the Tg is less than 10° C., curing is insufficient and, therefore, the transparent plastic substrate is deformed by the force exerted in removing the substrate from the mold. This is a great problem in obtaining a transparent plastic substrate having substrate performance of, e.g., high surface smoothness. On the other hand, if the Tg is more than 100° C., the cross-linking reaction of the polyfunctional (meth)acrylate compound proceeds partially and the molded product becomes brittle. Therefore, the substrate breaks in the mold due to the residual strain such as cure shrinkage and causes cracking. Moreover, the substrate breaks by the force exerted at the time of removing the substrate from the mold and causes cracking. The Tg range of the substrate resin at the time of removing from the mold is 10° to 100° C. and preferably 20° to 80° C. As a result, the radical polymerization time of the polyfunctional (meth)acrylate in the mold can be controlled to be 2 hours or less and preferably 1 hour or less.

The plastic substrate removed from the mold is placed on a first place and post-cured until its Tg reaches 110° C. or more. This post-curing enables to proceed the curing reaction to the extent that the performance of the substrate is satisfactory, without causing the breakage and cracking due to the curing in the mold. The post curing can be carried out by tecnhiques such as heating, irradiation with ultraviolet rays and irradiation with electron beams.

The post-curing is preferably carried out stepwise with respect to the temperature and irradiation dose. The post-curing temperature is preferably 150° C. or more. It is also preferred that the transparent plastic substrate is obtained by curing the same at temperatures of 200° C. or more in a vacuum, nitrogen or inert gas atmosphere.

In the present invention, the pre-cured plastic substrate is removed from the mold just in the incomplete radical polymerization state that the glass transition temperature of the pre-cured substrate is 10° to 100° C., so that mechanical residual strain and optical residual strain due to the shrinkage during polymerization can be minimized. By carrying out the post-curing after removal from the mold, a difference in mechanical residual strain between the surface and the inside of the substrate, which is due to the restrain of mold can be removed. This post-curing is such that the glass transition temperature of the plastic substrate obtained by the polymerization in the mold is 10° to 100° C., and in order to maintain the shape, the temperature cannot be rapidly increased to 150° C. If the post-curing temperature is low, the residual content of double bond is increased. However, by post-curing at temperature of 150° C. or more, the radical polymerization of the residual portion of double bond proceeds, resulting in decrease in the content of double bond in the substrate.

The present invention is explained in greater detail by reference to the following Examples and Comparative Examples. Unless otherwise indicated, all percents, parts, ratios and the like are by weight.

In the Examples and Comparative Examples, the glass transition temperature (Tg), the residual content of double bond (%), and the influence onto a recording film were measured by the following methods.

Glass Transition Temperature (Tg)

Measured with a differential scanning colorimeter (DSC) (Du Pont 990 System) at a rate of 10° C./min. in air.

Residual Content of Double Bond (%)

Measured by the IR analytical method.

A base line is drawn in peaks of 1560 to 1660 cm$^{-1}$ and 2600 to 3600 cm$^{-1}$. The areas, $S_1$ and $S_2$, of the peaks of 1560 to 1660 cm$^1$ and 2600 to 3600 cm$^{-1}$ are measured, and n is determined by the equation: $n = S_1/S_2$. With n of a liquid resin as 100% and n at $S_i=0$ as 0%, a calibration line is determined. Each sample is measured for n, and % is calculated from the calibration line.

Influences on Recording Film

Examination of the shape after soaking in water.

As shown in the drawing, a recording film 2 is formed on a substrate 1 by sputtering, and sealed with a quartz plate 3 through a teflon spacer 4 and a paraffin wax 5 and clamped with a clamp 6. This is dipped in a thermostat 7 filled with pure water 8. When the degree of saturated water absorption is reached, it is taken out and its shape is examined with a microscope.

EXAMPLE 1

0.5 parts of benzoyl peroxide was added to 100 parts of 2,2'-bis[4-($\beta$-methacryloyloxyethoxy)cyclohexyl]propane to prepare a liquid resin. This mixture was heated to 60° C., uniformly stirred and mixed, defoamed, poured into a cavity of a mold constituted by a glass plate having a diameter of 120 mm, a silicone rubber and a metal stamper, and cured at a polymerization temperature of 80° C. After 30 minutes, the cured product was removed from the mold. This operation could be conducted easily. A crack- and defect-free plastic disc substrate was obtained. Tg of the plastic disc substrate was 38° C.

The substrate was placed on a flat plate and post-cured at 80° C., and a transparent plastic disc substrate having good transferring properties of a stamper signal was obtained.

The substrate had not defect, i.e., the appearance was good, and the substrate had no warp.

The residual content of double bond in the substrate post-cured at 150° C. for 2 hours was 28%, and the degree of saturated water absorption was 1.3%.

EXAMPLE 2

A polymerizable solution prepared by adding 0.5 part of benzoyl peroxide to 100 parts of bis(oxymethyl)tricyclo[5,2,1,0$^{2,6}$]decane dimethacrylate in place of 2,2'-bis[4-($\beta$-methacryloyloxyethoxy)cyclohexyl]propane in Example 1 was subjected to the pre-curing in the same manner as in Example 1. After 35 minutes, the cured product was removed from the mold. This operation could be carried out easily. A crack- and defect-free plastic disc substrate was obtained.

Tg of the plastic disc substrate was 38° C.

The substrate was placed on a flat plate and post-cured at 100° C., and a plastic disc substrate having the final Tg of 251° C. and good transferring properties of a stamper signal was obtained.

EXAMPLE 3

A polymerizable solution prepared by adding 0.5 part of benzoyl peroxide to 60 parts of 2,2'-bis[4-($\beta$-methacryloyloxy)cyclohexyl]propane and 40 parts of trimethylolpropane trimethacrylate was subjected to pre-curing in the same manner as in Example 1. After 35 minutes, the cured product was removed from the mold. This operation could be carried out easily. A crack- and defect-free plastic disc substrate was obtained. The Tg of the plastic disc substrate was 25° C.

The substrate was placed on a flat plate and post-cured at 80° C., and a plastic disc substrate having the final Tg of 168° C. and good transferring properties of a stamper signal was obtained.

COMPARATIVE EXAMPLE 1

0.5 Part of benzoyl peroxide was added to 100 parts of 2,2'-bis[4-($\beta$-methacryloyloxyethoxy)cyclohexyl]propane to prepare a polymerizable solution. This solution was subjected to the pre-curing (polymerization temperature: 80° C.; time: 4 hours) in a mold in the same manner as in Example 1. The cured product was removed from the mold. The curing reaction in the mold proceeded only partially, and the cured product was brittle. During the operation, the plastic disc substrate was cracked. Tg of the plastic disc substrate was 132° C.

EXAMPLE 4

To 100 parts of 2,2'-bis[4-($\beta$-methacryloyloxyethoxy)cyclohexyl]propane were added 0.5 part of a photosensitizer (Irgacure® 651, produced by Ciba Geigy AG) and 0.5 part of benzoyl peroxide. The resulting mixture was heated to 60° C., uniformly stirred and mixed, and defoamed. This liquid was poured into a cavity of a mold constituted by a glass plate having a diameter of 120 mm, a silicone rubber and a metal stamper, and irradiated with ultraviolet rays by passing 20 times under a 80 W/cm UV lamp. The cured product was then removed from the mold to obtain a crack- and defect-free plastic disc substrate. The Tg of this substrate was 25° C.

The Tg of the substrate post-cured at 80° C. for 2 hours was 148° C., and the residual content of double bond was 38%.

The substrate prior to post-curing was post-cured at 150° C. for 2 hours. The residual content of double bond in the substrate thus post-cured was 32%, and the degree of saturated water absorption of the substrate was 1.6%.

EXAMPLE 5

A crack- and defect-free plastic disc substrate was obtained in the same manner as in Example 1 except that bis(oxymethyl)tricyclo[5,2,1,0$^{2,6}$]decane dimethacrylate was used in place of 2,2'-bis[4-($\beta$-methacryloyloxyethoxy)cyclohexyl]propane.

The Tg of the plastic disc substrate was 38° C.

The substrate was placed on a flat plate and post-cured at 100° C. to obtain a plastic disc substrate having the final Tg of 251° C. and good transferring properties of stamper signal.

This substrate was post-cured at 150° C. for 2 hours. The residual content of double bond in the substrate thus obtained was 28%.

This substrate was further post-cured at 200° C. for 2 hours. The residual content of double bond in the substrate thus obtained was 17%.

This substrate was additionally post-cured in $N_2$ at 300° C. for 2 hours. The residual content of double bond in the substrate thus obtained was 8%.

Each substrate was measured for the degree of water absorption and the influences on a recording film.

The results obtained are shown in the Table below.

TABLE

| Post-Curing Temperature (°C.) | Degree of Saturated Water Absorption (%) | Influences on Recording Film |
|---|---|---|
| 100 | 1.9 | Numerous pinholes |
| 150 | 1.5 | Several pinholes |
| 200 | 0.9 | Good |
| 300 (in $N_2$) | 0.7 | Good |

COMPARATIVE EXAMPLE 2

The procedure of Example 4 was repeated except that the post-curing was carried out only by irradiation with ultraviolet rays. Even after UV lamp 50 time passages, the Tg was 120° C. and did not reach to the final Tg of 148° C. The residual content of double bond was about 43 to 45%.

While the invention has been described in detail and with reference to specific embodiments thereof, it will be apparent to one skilled in the art that various changes and modifications can be made therein without departing from the spirit and scope thereof.

What is claimed is:

1. A method for obtaining a molded transparent plastic substrate by radical polymerizing a polymerizable monomeric liquid composed of at least one polyfunctional (meth)acrylate compound, the polymerization reactions consisting essentially of radical polymerization reactions, any catalyst present being a radical initiator, by a cast molding method, wherein in a first step the final shape of the plastic substrate is obtained by radical polymerizing the polyfunctional (meth)acrylate compound under cast molding conditions in a mold until the glass transition temperature of the polymerizing composition reaches 10° to 100° C., in a second step the shaped substrate as obtained in the first step is removed from the mold and in a third step the substrate is post-cured free of the restraints of a mold to obtain a substrate having a glass transition temperature of 110° C. or more and having the shape imparted by the first step.

2. The method as claimed in claim 1, wherein the polyfunctional (meth)acrylate compound is a compound represented by the formula (I):

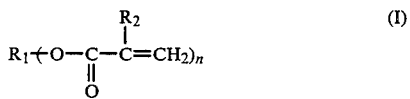

wherein $R_1$ is an alcohol residue having 2 to 50 carbon atoms, $R_2$ is H or $CH_3$, and n is an integer of 2 to 6.

3. A method for obtaining a molded transparent plastic substrate by radical polymerizing a polymerizable monomeric liquid composed of at least one polyfunctional (meth)acrylate compound alone or admixed with at most 10% of other radical polymerizable monomers, the polymerization reactions consisting essentially of radical polymerization reactions, any catalyst present being a radical initiator, by a cast molding method, wherein in a first step the final shape of the plastic substrate is obtained by radical polymerizing the polyfunctional (meth)acrylate compound under cast molding conditions in a mold until the glass transition temperature of the polymerizing composition reaches 10° to 100°, in a second step the shaped substrate as obtained in the first step is removed from the mold, and in a third step the substrate is post-cured at a temperature below 150° C. free of the restraints of a mold to obtain a substrate having a glass transition temperature of 110° C. or more, and this substrate is then further post-cured at a temperature of 150° C. or more, the shape of the final product being that imparted by the first step.

4. The method as claimed in claim 3, wherein the polyfunctional (meth)acrylate compound is a compound represented by the formula (I):

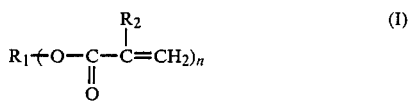

wherein $R_1$ is an alcohol residue having 2 to 50 carbon atoms, $R_2$ is H or $CH_3$, and n is an integer of 2 to 6.

5. The method as claimed in claim 3, wherein the radical polymerization in the mold is carried out by irradiation with ultraviolet rays.

6. The method according to claim 2 wherein the polyfunctional (meth)acrylate compound is admixed with at most 10% of other radical polymerizable monomers.

7. The method according to claim 4, wherein the polyfunctional (meth)acrylate compound is admixed with at most 10% of other radical polymerizable monomers.

8. The method as claimed in claim 2 wherein the monomeric liquid is composed of at least one polyfunctional (meth)acrylate compound alone.

9. The method as claimed in claim 5 wherein the monomeric liquid is composed of at least one polyfunctional (methy)acrylate compound alone and the transparent substrate is a disc substrate for optical discs or magneto optical discs.

* * * * *